United States Patent [19]

Drouin et al.

[11] Patent Number: 5,098,025

[45] Date of Patent: Mar. 24, 1992

[54] PROCESS FOR RECYCLING AS A WHOLE ASPHALT CONTAINING WASTE PRODUCTS

[75] Inventors: Michel P. Drouin, Ile Perrot; Khalid S. Jasim, Beaconsfield; Robert J. Booth, Dalkeith; Bertram E. Barnswell, Scarborough, all of Canada

[73] Assignee: Northern Globe Building Materials, Inc., Toronto, Canada

[21] Appl. No.: 663,773

[22] Filed: Mar. 4, 1991

Related U.S. Application Data

[63] Continuation of Ser. No. 432,287, Nov. 3, 1989, abandoned.

[51] Int. Cl.$^5$ ............................................. B02C 19/12
[52] U.S. Cl. ........................................ 241/21; 241/23; 241/29; 241/DIG. 38
[58] Field of Search ...................... 208/39; 366/25, 40; 241/23, 29, 21, 152 A, DIG. 38, 65

[56] References Cited

U.S. PATENT DOCUMENTS

| | | |
|---|---|---|
| 2,128,191 | 8/1938 | Reynolds . |
| 2,893,889 | 7/1959 | Schultz et al. . |
| 3,114,694 | 12/1967 | Bergongrou et al. . |
| 3,235,483 | 2/1966 | McCoy . |
| 4,222,851 | 9/1980 | Good . |
| 4,269,693 | 5/1981 | Hastie . |
| 4,477,250 | 10/1984 | Brashears et al. ............... 241/23 X |
| 4,706,893 | 11/1987 | Black . |
| 4,928,890 | 5/1990 | Swisher ................. 241/24 |

FOREIGN PATENT DOCUMENTS

830887 12/1969 Canada .

*Primary Examiner*—Mark Rosenbaum
*Attorney, Agent, or Firm*—Antoine H. Gauvin

[57] ABSTRACT

A process for recycling an asphalt-containing waste product, that comprises breaking up an asphalt-containing waste product in a liquid to produce a wet waste product mixture having particles no greater in size than 10 mesh and at least some of which are asphalt-containing particles. Thereafter the wet waste product mixture is directly used to produce a new asphalt product. New asphalt products are produced entirely or partly from the wet waste product mixture.

12 Claims, No Drawings

PROCESS FOR RECYCLING AS A WHOLE ASPHALT CONTAINING WASTE PRODUCTS

This is a continuation application of application Ser. No. 07/432,287, filed Nov. 3, 1989 and now abandoned.

FIELD OF THE INVENTION

This invention is directed toward new processes of recycling asphalt-containing, waste products.

The invention is also directed toward asphalt-containing products produced with the new recycling processes.

BACKGROUND OF THE INVENTION

Asphalt-containing, waste products are normally disposed of at the present time as landfill. However land suitable for landfill purposes is becoming harder to find and landfill costs are rising. Also, asphalt-containing, waste products are a potential fire hazard in landfill sites and pollute the atmosphere when burning. The asphalt itself in the waste products is also becoming too valuable a commodity to throw away.

It had been proposed to recycle the asphalt-containing, waste products to recover the asphalt and also other components of the products. However the known methods are not very economical. Most of the known methods try to recover the asphalt in pure form and the methods used are quite expensive. It is known, for example, as shown in U.S. Pat. No. 4,222,851 to dry grind waste asphalt shingles and to treat the ground particles with solvent to dissolve the asphalt and to then recover the pure asphalt by evaporation. The other shingle components such as fibers and rock granules are also separated and recovered. This method involves a number of steps and is quite complicated and expensive.

U.S. Pat. No. 4,269,693 discloses grinding a waste asphalt product at a cool temperature and then using a flotation step to separate lighter particles including asphalt from heavier particles. The lighter particles are then melted and filtered to obtain pure asphalt. Again many steps are employed asking the method expensive.

U.S. Pat. No. 4,706,893 discloses the dry grinding of waste asphalt shingles into asphalt containing particles and directly incorporating the dry waste particles into the making of a new asphalt product. This method is quite cheap but is only suitable for use with an asphalt plant which heats asphalt and mixes it with granules.

THE INVENTION

It is the purpose of the present invention to provide new processes for recycling waste asphalt products which are economical and which can be used in the manufacture of various asphalt products.

It is also the purpose of the present invention to provide new asphalt products containing recycled waste asphalt products.

In accordance with the present invention the waste asphalt product is broken up in a liquid as will be defined herein below, to provide a wet mixture of liquid and particles. The particles in the wet mixture can be all asphalt particles, a mixture of asphalt and non-asphalt particles, or a mixture of asphalt, part asphalt and non-asphalt particles depending on the waste asphalt product used. The wet mixture can then be used directly as a new asphalt product or incorporated into the making of a new asphalt product. No separation steps are needed to obtain pure asphalt and thus the process is quite inexpensive.

It has been found that the incorporation of the components, other than the asphalt, found in waste asphalt products into certain new asphalt products does not adversely affect the new products and may, in some cases, improve the new products. Incorporation of the other waste asphalt components into new asphalt products reduces the amount of new material needed in making the new products thus lowering their cost. When the components comprise fire resistant materials, such as rock granules and glass fibers obtained from grinding up waste shingles for example, the new products incorporating these components make it harder for a flame to spread when burning and thus are more fireproof.

The process of the present invention can use most waste asphalt products. It is particularly suited however for using asphalt roofing waste, and particularly asphalt roofing shingles and waste products resulting from their manufacture. Old, used shingles; rejected new shingles; waste shingle material formed during the manufacture of new shingles, such as when making cutouts in the shingles are examples of waste asphalt shingle products that ca be used are asphalt roofing felt; asphalt: roofing membranes; asphalt roofing material other than shingles.

A PREFERRED WAY OF CARRYING THE INVENTION

The waste asphalt product must be broken up into particles no larger than about 10 mesh in order to be properly incorporated into a new asphalt product. If the waste asphalt product is a felt material it can be broken up into particles of the required size by pulping it and then refining it, according to the pulp and paper art, and then used in the making of fiberboard for instance. If the waste asphalt product is a more rigid, stable product such as a shingle it can first be shredded into smaller pieces and then ground up preferably in comminution mill, such as a SZEGO mill to the required size, but other mill such as a ball or roller mill may be used.

The waste asphalt product, in accordance with the present invention, is broken up in a liquid to provide a wet waste product mixture. Breaking up of the waste asphalt product, particularly grinding it, in a dry environment generates heat causing the asphalt pieces and particles to soften and clump together. More power is required to grind the clumped pieces and particles In the present process, the waste asphalt products are ground up in enough liquid to prevent the pieces and particles from heating up to a temperature where they begin clumping. Since climping is prevented, less power is required to grind up the waste products. This allows smaller and cheaper grinding equipment to be used. There may be grinding situations where not enough liquid to prevent clumping is used. In this case, the temperature of the mixture could be controlled to prevent clumping by controlling the temperature of the grinding equipment. This could be done by cooling the equipment using refrigerant coils, or the like, however the sole use of liquid as defined above is most preferred.

The liquid employed in breaking up the waste asphalt product is the same liquid that is used in the production of the new asphalt product into which the wet waste product mixture is to be incorporated. The liquid employed can be water or an asphalt solvent by way of example. Water is employed when breaking up the waste asphalt product by pulping. Water is also normally employed when grinding the waste asphalt product to produce a slurry that can be used in the manufacture of asphalt fiberboard or asphalt emulsion products. A solvent can be employed when grinding the waste asphalt product to produce a wet mixture that can be used in the manufacture of cut-back asphalt products. Cut-back asphalt products are defined as those products that employ a solvent in their make-up that at least partly dissolves, or at least makes tacky, the asphalt in the product.

When grinding multi-componented waste asphalt products in a liquid, for example in particular with water, many of the components, other than asphalt, are partly or completely coated with asphalt. If the waste product is shingles for example, the other components comprise cellulosic or glass fibers, rook granules, talc and particles of filler material such as limestone. Most of these components are covered at least in part with asphalt during the grinding operation. However the liquid and particularly water, in the grinding operation helps keep these asphalt covered components apart. The wet waste product mixture includes many asphalt-containing particles but also asphalt particles and non-asphalt particles per se. These particles are fairly evenly dispersed throughout the wet mixture with a minimum of component separation. As a result, the wet waste product mixture can easily be incorporated into a wet mixture used in the making of a new asphalt product, the asphalt in the waste product mixture, and sometime the filler and the fibres, taking the place of some of the new asphalt and other raw materials normally needed in the production of the new product. Of course the other material components in the waste product mixture are also incorporated into the new product mixture but this does not adversely affect the new product and may in fact improve it. It will be seen that no separation of the various components making up the waste asphalt product is needed before incorporating the components into the make-up of a new product. Thus the process is very efficient.

The invention is particularly directed toward a process of recycling an asphalt-containing waste product which comprises breaking up the asphalt-containing waste product in a liquid to produce a wet waste product mixture having particles no greater in size than 10 mesh and at least some of which are asphalt-containing particles, and directly using the wet waste product mixture to produce new asphalt products.

In a particular embodiment, the invention is directed to a process for recycling asphalt shingles and their manufacturing waste comprising: shredding the asphalt shingles; grinding the shredded shingles in an attrition mill in water to produce a waste product slurry having particles that are no larger than 10 mesh, at least some of the particles being asphalt containing particles; controlling the temperature of the grinding operation to prevent clumping of the particles; and adding the waste product slurry to a new slurry used to make an asphalt fiberboard in an amount up to 50% of the new slurry needed to make the fiberboard, the waste product slurry providing used components to replace new components normally used in the new product slurry and thereby making new products.

The invention will now be more fully described with reference to specific examples which are intended to be illustrative only, it being understood that the invention is not limited to the materials, amounts or conditions set forth therein.

EXAMPLE 1

Asphalt roofing shingles are ground up with water in a ball mill to produce a water-based, waste product slurry. The shingles can be made with cellulosic (also known as cellulose fibers) or glass fibers, referred to respectively as cellulosic or glass shingles.

The composition of the shingles of glass fibers and cellulosic fibers is for instance respectively as follows:

| Glass fibers | | Cellulosic fibers | |
| --- | --- | --- | --- |
| Asphalt: | about 21% | Asphalt: | about 35% |
| Glass: | about 2% | Cellulosic fibers: | about 10% |
| Other solids: | | Other solids: | |
| (rock granules, limestone, talc) | about 77% | (rock granules, limestone, talc) | about 55% |
| These solids are also referred to as fillers. | | | |

In one instance, the cellulosic shingles were first shredded and then ground up in the ball mill with water to provide a waste product slurry having a consistency of between 10% and 60% and preferably a consistency of between 35% and 45%. The temperature of the mixture in the ball mill never exceeded 45° C. The particles were ground to a size less than a 10 mesh and preferably averaged between 65 and 425 mesh.

Fiberboard

The waste product slurry from the ball mill was then added to a slurry used to make an asphalt fiberboard. The asphalt fiberboard normally has the following composition:

| Cellulosic fibers | about 95% |
| --- | --- |
| Asphalt (new) | about 5% |
| Starch may also be present if desired | |

The slurry used to produce the asphalt fiberboard has a consistency of between 1% and 5%. The waste-product slurry can have its consistency adjusted to that of the fiberboard slurry and it is then added to the fiberboard slurry in an amount sufficient to add enough used asphalt to replace the new asphalt. This would amount to about 10–20% of the fiberboard dry material being replaced by the dry material in the slurry. The resulting fiberboard has the following composition:

| Cellulosic fibers | from 82% to 91% |
| --- | --- |
| Asphalt (old) | from 3.5% to 7.0% |
| Other solids (rock granules, limestone, talc) | from 5.5% to 11% |

The inclusion of the other solids, replacing part of the cellulosic fibers, does not adversely affect the properties of the fiberboard and in fact makes the board slightly more fire resistant. It will also be noted that all of the asphalt requirements can be met by using recycled asphalt thus affecting a substantial saving in the cost of the fiberboard.

While the amount of dry material in the fiberboard replaced by the waste product in the above example was 15%, a larger percentage of the dry material could be replaced by the waste product if a fiberboard with more asphalt is required. The waste product slurry can be made with cellulosic and/or glass shingles. Between 5 and up to 50% of the dry material in a fiberboard could be replaced by the waste product.

If 5 to 50% of the dry material in a fiberboard were replaced by the waste product, (from glass or cellulosic shingles), the resulting fiberboard would have the following composition:

| | |
|---|---|
| Fibers consisting of at least one member selected from the group consisting of cellulose fibers and mixture of cellulose fibers and glass fibers: | from 50 to 96% |
| Asphalt: | from 1.0 to 17.5% |
| Other solids having particles no greater in size than 10 mesh and being members selected from the group consisting of rock granules, limestone, talc: | from 3 to 39% |
| Starch may also be added, if desired | |

EXAMPLE 2

Asphalt roofing shingles are ground up with a solvent in a ball mill to produce a solvent-based, waste product mixture. As in Example 1 the shingles can be made with cellulosic or glass fibers The composition of the shingles is as in Example 1.

The solvent employed can be mineral spirits, benzene or any other suitable asphalt solvent. The solvent need not completely dissolve the asphalt for the process to be effective. In fact in some applications the solvent may need to be strong enough only to make the asphalt tacky.

The shingles are shredded and then combined with the solvent in a ball mill where the shredded shingle pieces are ground up into particles. Normally clumping is not a problem when grinding in a solvent since the asphalt is dissolved. However if the solvent is not strong enough to dissolve all of the asphalt and clumping does become a problem, it can be overcome as when grinding in water. Sufficient solvent can be used to minimize clumping and if needed, the equipment can be refrigerated.

The shingles are ground-up in solvent at a consistency ranging from between 10% to 85% and preferably at a consistency ranging between 55% and 70%.

Cut-back Asphalt Product

The solvent-based waste product mixture can be used in the production of cutback asphalt products to replace the new asphalt used in these products. Cut-back asphalt products are defined as a product in which the asphalt is at least partly dissolved in a solvent. Cut-back asphalt products can be used as waterproof and dampproofing coating products. A typical cut-back asphalt product has the following composition:

| | |
|---|---|
| Asphalt | about 38% |
| Solvent | about 22% |
| Filler material | about 35% |
| Cellulosic fibers | about 5% |

From 5 to 75% of the above composition can be replaced with the solvent-based waste product mixture. This results in large proportions of the new asphalt, solvent, filler material and cellulosic fibers being replaced by the components in the solvent-based waste product mixture.

A typical example of the composition of cellulosic shingle waste ground at a consistency of 60% in a solvent is as follows:

| | |
|---|---|
| Solvent | 40% |
| Asphalt | 21% |
| Cellulosic fiber | 6% |
| Solids | 33% |

For example, when up to 75% (5 to 75%) of a typical cut-back asphalt product composition (see p 10, line 10) is replaced with the ground cellulosic shingle waste product mixture, the new cut-back asphalt product has the following composition:

| | | |
|---|---|---|
| Asphalt new | 9.5–36.1% | 25.25–37.15% |
| old | 1.05–15.75% | |
| Solvent new | 5.5–20.9% | 22.9–35.5% |
| old | 2.0–30% | |

Filler i.e.: other solids, rock granules, limestones and talc having particles size no greater than 10 mesh

| | | |
|---|---|---|
| new | 8.75–33.25% | 33.5–34.9% |
| old | 1.65–24.75% | |
| Fibre new | 1.25–4.75% | 5.05–5.75% |
| old | 0.3–4.5% | |

A typical example of the composition of glass shingle waste ground at a consistence of 60% in a solvent is as follows:

| | |
|---|---|
| Solvent | 40% |
| Asphalt | 12.6% |
| Glass fibers | 1.2% |
| Solids | 46.2% |
| | 100.00% |

For example, if up to 75% (5 to 75%) of a typical cut-back asphalt product composition were replaced with the ground glass shingle waste product mixture, the new cut-back asphalt product would have the following composition:

| | | |
|---|---|---|
| Asphalt new | 9.5–36.1% | 18.95–36.73% |
| old | 0.63–9.45% | |
| Solvent new | 5.5–20.9% | 22.9–35.5% |
| old | 2–30% | |
| Filler new | 8.75–33.25% | 35.56–43.4% |
| old | 2.31–34.65% | |
| Glass fibers (old) | 0.06–0.9% | 2.15–4.81% |
| Cellulosic (new) | 1.25–4.75% | |

From the above it is seen that the major portions of the components of a standard cut-back asphalt product can be replaced with the solvent-based waste product mixture derived from grinding up shingles in a solvent. While the proportion and make-up of the filler material has changed, the properties of the cut-back asphalt product are essentially the same. If the product is a coating product, the grinding operation is carried out to produce a particle size averaged between 65 and 425 mesh, rather than to 10 to 65 mesh so that the rock granules are not large enough to give a rough finish.

EXAMPLE 3

The asphalt roofing shingles are ground up with water and a surfactant to produce a water-based, waste product emulsion. This emulsion can be used to replace the asphalt, and other components, used in asphalt emulsion products. Asphalt emulsion products can be used as roof coating, waterproofing and damproofing agents.

As in Example 1, the shingles can be made with cellulosic or glass fibers. The composition of the shingles is as set out in Example 1.

The surfactant employed can be amine salt. Other suitable surfactant are amionic fluorochemicals for example.

The shingles are shredded and then ground up in a ball mill with water and a surfactant to produce a waste product emulsion. The consistency of the waste product emulsion ranges between 10% and 60% and preferably is between 35% and 45%.

The waste product emulsion is added to an asphalt emulsion product during its manufacture to replace some of its components. A typical asphalt emulsion product has the following composition:

| Asphalt: | about | 60% |
| Filler: | about | 4% |
| Surfactant: | about | 1.5% |
| Water: | about | 34.5% |

The water-based, waste product emulsion can be used to replace up to 80% of the dry components in the above asphalt emulsion product. Preferably however it can be used to replace between 40% and 50% of the dry components in the emulsion product. The waste product emulsion would replace part of the asphalt filler and fiber used in the emulsion product. With the waste emulsion product, at a consistency between 35 and 45%, replacing 40 to 50% of the dry components in the emulsion product, the new emulsion products have the following composition:

| Asphalt (new): | from | 30 to 36% |
| Asphalt (old): | from | 2.94 to 7.875% |
| For a total asphalt composition: | from | 32.9 to 39.8% |
| Filler (new): | from | 2.0% to 2.4% |
| Filler including other solids having particles no greater in size than 10 mesh and being members selected from the group consisting of rock granules, limestone and talc: | from | 9.1 to 17.775% |
| Surfactant: | from | 0.75 to 0.9% |
| For a total filler composition: | from | 11.5 to 19.8% |
| Water: | from | 42.7 to 49.75% |

It will be seen that the waste product can be used to replace or reduce a large proportion of the new components used in manufacturing an asphalt emulsion product resulting in significant savings. The addition of the rock granules to the product does not adversely affect its properties provided the granules are ground fine enough to avoid a rough finish in the coating formed by the product.

There are many other asphalt products over and above the three shown in the above examples that can employ at least a small percentage of waste asphalt product in their make-up. The waste asphalt product is easily and economically made up and is easily added to a new asphalt product during its manufacture. Other asphalt products which can incorporate waste asphalt products in this make-up would be sheathing products, roof boards, and expansion joints by way of example. In some cases the waste asphalt product can even by used as is for certain coating applications.

EXAMPLE 4

Pulping and Refining

Pulping

Black papers waste containing between 35% and 55% cellulosic fibers, 45-65% asphalt, wherein the cellulosic felt is impregnated with asphalt were pulped in a Hydro-pulper at a consistency between 1 and 25, and preferably 10-15% generally during ½ to 1 hours, although ¼ hour to 2 hours may be used.

Typical characteristics of the pulp after pulping were as follows

| | | 1-25% consistency |
| water | | 75-99% |
| fibers | | 0.45-11.25% |
| Asphalt | | 0.55-13.75%, and |
| | preferably | 10-15% consistency |
| water | | 85-90% |
| fibers | | 4.5-6.75% |
| asphalt | | 5.5-8.25% |

A part of the pump was used to make directly fibreboard. However, a much better fibreboard was obtained by refining.

Refining

The refining was done in a dish refiner such a Sprout Waldron (Plates 2976A—1 rotor and 1 stator) or other suitable type using a suitable amount of water and this contrary to those skilled in the art that thought it would be impossible and that it would gum up the refiners. The pulp was fed at a consistency preferably between 2 and 8 and extended between 1 and 25%. The plates should be as close as possible.

The pulp after refining had the following characteristics:

| consistency: | 1-8% |
| water: | 92-99% |
| fibers: | 0.45-3.6% |
| asphalt: | 0.55-4.4%, |
| and preferably: | |
| consistency: | 2-4% |
| water: | 96-98% |
| fibers: | 0.9-1.8% |
| asphalt: | 1.1-2.2% |

The pump was used to make an asphaltic fibreboard. The asphalt fibreboards were made in part from 1 to 65% with the black paper pulp, and preferably 10-35%, which has the following composition:

| fiber | from black paper waste | 4.5% to 15.75% |
| | from wood | 65% to 90% |
| asphalt | from black paper waste | 5.5% to 19.25% |

Having described the invention, numerous modifications will be evident to those skilled in the art without departing from the spirit of the invention, as defined in the appended claims.

What is claimed is:

1. A process for recycling as a whole, a waste product selected from the group consisting of asphalt shingles including manufacturing waste thereof, roofing waste and roofing membranes including manufacturing waste thereof containing at least 21% asphalt, into a wet mixture product comprising asphalt particles and liquid, said process comprising shreading and then breaking up by grinding in an attrition mill in a liquid the shredded pieces of said waste product containing at least 21% asphalt into particles no greater in size than 10 mesh, said liquid preventing clumping of particles during said grinding, to produce after said breaking up a wet waste product mixture comprising asphalt particles and liquid, and directly using the wet waste product mixture to produce a new asphalt product comprising at least 3.5% asphalt.

2. A process as claimed in claim 1 wherein the new asphalt product is produced entirely from the wet waste product mixture.

3. A process as claimed in claim 1 wherein the new asphalt product is produced partly from the wet waste product mixture, the asphalt in the wet waste product mixture replacing some of the asphalt normally used in the making of the new asphalt product.

4. A process as claimed in claim 1 wherein the liquid is water and the resulting wet waste product mixture is added to a water-based new product slurry to produce a new asphalt product.

5. A process as claimed in claim 4 wherein the temperature of the grinding operation is controlled to prevent the asphalt-containing particles from clumping.

6. A process as claimed in claim 5 wherein the temperature of the grinding operation is controlled by controlling the amount of liquid available, there being sufficient liquid to prevent the asphalt from heating up to a clumping temperature.

7. A process as claimed in claim 5 wherein the grinding operation is conducted in a grinding apparatus and the temperature of the grinding operation is controlled by controlling the temperature of the grinding apparatus.

8. A process as claimed in claim 1 wherein the temperature of the grinding operation is controlled to prevent the asphalt-containing particles from clumping.

9. A process as claimed in claim 1 wherein the liquid is an asphalt solvent and the resulting wet waste product mixture is added to a solvent-based new product mixture to produce a new asphalt product.

10. The process according to claim 1 wherein said new asphalt product is produced partly from said wet waste product mixture and partly from wood fibers, the asphalt in said wet waste product mixture replacing some of the asphalt normally used in the making of the new asphalt product.

11. A process for recycling asphalt shingles and their manufacturing waste comprising: shredding the asphalt shingles; grinding the shredded shingles in an attrition mill in water to produce a waste product slurry having particles that are no larger than 10 mesh, at least some of the particles being asphalt containing particles; controlling the temperature of the grinding operation to prevent clumping of the particles; and adding the waste product slurry to a new slurry used to make an asphalt fiberboard in an amount up to 50% of the new slurry needed to make the fiberboard, the waste product slurry providing used components to replace new components normally used in the new product slurry.

12. A process for recycling asphalt shingles and their manufacturing waste comprising: shredding the asphalt shingles; grinding the shredded shingles in an attrition mill in solvent to produce a wet waste product mixture having particles that are no larger than 10 mesh; and forming a new asphalt product by adding an amount of said wet waste product mixture to a new asphalt material in an amount such that said wet waste product mixture is 5% to 75% of said new asphalt product and said new asphalt material is respectively 95% to 25% of said new asphalt product.

* * * * *